United States Patent
Lyons

(10) Patent No.: US 11,700,114 B2
(45) Date of Patent: Jul. 11, 2023

(54) COMPLIANCE AUDITING FOR ENCRYPTED VIDEO CONFERENCES

(71) Applicant: Zoom Video Communications, Inc., San Jose, CA (US)

(72) Inventor: Karan Lyons, Los Angeles, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 147 days.

(21) Appl. No.: 17/389,628

(22) Filed: Jul. 30, 2021

(65) Prior Publication Data

US 2023/0034088 A1    Feb. 2, 2023

(51) Int. Cl.
  *H04L 9/08*     (2006.01)
  *H04L 12/18*    (2006.01)
  *H04L 29/06*    (2006.01)
  *H04L 9/40*     (2022.01)
  *H04L 65/403*   (2022.01)

(52) U.S. Cl.
  CPC .......... *H04L 9/0833* (2013.01); *H04L 9/0825* (2013.01); *H04L 12/1827* (2013.01); *H04L 63/0428* (2013.01); *H04L 65/403* (2013.01)

(58) Field of Classification Search
  CPC . H04L 9/0833; H04L 9/0825; H04L 12/1827; H04L 63/0428; H04L 65/403; H04L 9/08; H04L 12/18; H04L 29/06
  See application file for complete search history.

(56) References Cited

U.S. PATENT DOCUMENTS

| | | | |
|---|---|---|---|
| 2002/0029350 | A1 | 3/2002 | Cooper et al. |
| 2015/0106629 | A1* | 4/2015 | Anderson .............. H04N 7/152 726/4 |
| 2020/0104517 | A1* | 4/2020 | Hawkins ............... H04L 9/3273 |

OTHER PUBLICATIONS

EP International Search Report and Written Opinion for PCT/US2022/033942 dated Oct. 20, 2022.
Kirstein et al., "The MECCANO Internet Multimedia Conferencing Architecture," www.ejeisa.com/nectar/meccano/meccano-r3.1.pdf, Dec. 1999; pp. 1-66.
Blum et al., "E2E Encryption for Zoom Meetings", https://github.com/zoom/zoom-e2e-whitepaper/raw/master/archive/zoom_e2e_v3.pdf, Dec. 15, 2020; pp. 1-55.

* cited by examiner

*Primary Examiner* — Quazi Farooqui
(74) *Attorney, Agent, or Firm* — Kilpatrick Townsend & Stockton LLP

(57) ABSTRACT

One example method includes receiving, by a compliance auditing server, an indication of an encrypted video conference; sending, by the compliance auditing server, a request to a video conference provider to join a compliance auditing participant to the encrypted video conference, wherein the video conference provider does not have access to the compliance auditing server; receiving and storing, by the compliance auditing server, encrypted streams of audio and video from a plurality of participants in the video conference, wherein: the compliance auditing participant is one of the plurality of participants; and the video conference provider does not have access to the cryptographic meeting key; receiving, by the compliance auditing server after the encrypted video conference has ended, a request for a portion of the encrypted streams of audio and video; and providing, in response to the request, the portion of the encrypted streams of audio and video.

20 Claims, 10 Drawing Sheets

COMPLIANCE AUDITING FOR ENCRYPTED VIDEO CONFERENCES

FIELD

The present application generally relates to hosting or participating in video conferences and more particularly relates to systems and methods for compliance auditing video conferences.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for compliance auditing encrypted video conferences. One example method includes receiving, by a compliance auditing server, an indication of an encrypted video conference; sending, by the compliance auditing server, a request to a video conference provider to join a compliance auditing participant to the encrypted video conference, wherein the video conference provider does not have access to the compliance auditing server; receiving and storing, by the compliance auditing server, encrypted streams of audio and video from a plurality of participants in the video conference, wherein: the compliance auditing participant is one of the plurality of participants; the encrypted streams of audio and video are encrypted by the respective participants using a cryptographic meeting key; and the video conference provider does not have access to the cryptographic meeting key; receiving, by the compliance auditing server after the encrypted video conference has ended, a request for a portion of the encrypted streams of audio and video; and providing, in response to the request, the portion of the encrypted streams of audio and video. Optionally, receiving and storing, by the compliance auditing server, the encrypted streams of audio and video can include transmitting a message to the video conference provider to store the encrypted streams of audio and video. In some embodiments, the compliance auditing server is hosted by the video conference provider.

In some examples, the example method further includes receiving and storing, by the compliance auditing server, the cryptographic meeting key associated with the encrypted video conference. The example method may also include receiving, by the compliance auditing server after the encrypted video conference has ended, a request for decrypted streams of audio and video; decrypting, by the compliance auditing server, a portion of the encrypted streams of audio and video using the cryptographic meeting key to generate the decrypted streams of audio and video; and providing, by the compliance auditing server, the decrypted streams of audio and video, and optionally, generating, by the compliance auditing server, an MP4 file of the decrypted streams of audio and video.

In further examples, the example method includes receiving, by the compliance auditing participant, one or more chat messages during the encrypted video conference, wherein the one or more chat messages are encrypted; and receiving and storing, by the compliance auditing server, the one or more chat messages received by the compliance auditing participant during the encrypted video conference, and optionally, receiving, by the compliance auditing server after the encrypted video conference has ended, a request for decrypted message data from the one or more chat messages; decrypting, by the compliance auditing server, the one or more chat messages using the cryptographic meeting key to generate the decrypted message data; and providing, by the compliance auditing server, the decrypted message data. The example method may also include receiving, by the compliance auditing server after the video conference has ended, a request for the cryptographic meeting key; and providing, in response to the request, the cryptographic meeting key.

One example system includes a non-transitory computer-readable medium; a communications interface; and a processor communicatively coupled to the non-transitory computer-readable medium and the communications interface, the processor configured to execute processor-executable instructions stored in the non-transitory computer-readable medium to: receive an indication of an encrypted video conference; send a request to a video conference provider to join a compliance auditing participant to the encrypted video conference, wherein the video conference provider does not have access to the compliance auditing server; receive and store encrypted streams of audio and video from a plurality of participants in the encrypted video conference, wherein: the compliance auditing participant is one of the plurality of participants; the encrypted streams of audio and video are encrypted by the respective participants using a cryptographic meeting key; and the video conference provider does not have access to the cryptographic meeting key; and receive a request for a portion of the encrypted streams of audio and video; and provide, in response to the request, the portion of the encrypted streams of audio and video. In some embodiments, the instructions to receive and store the encrypted streams of audio and video further cause the processor to execute further processor-executable instructions stored in the non-transitory computer-readable medium to: transmit a message to the video conference provider to store the encrypted streams of audio and video.

In some examples, the processor of the example system is configured to execute further processor-executable instructions stored in the non-transitory computer-readable medium to: receive and store the cryptographic meeting key associated with the encrypted video conference. The processor may also be configured to execute further processor-executable instructions stored in the non-transitory computer-readable medium to: receive, after the encrypted video conference has ended, a request for decrypted streams of audio and video; decrypt a portion of the encrypted streams of audio and video using the cryptographic meeting key to generate the decrypted streams of audio and video; and provide the decrypted streams of audio and video, and optionally, generate an MP4 file of the decrypted streams of audio and video.

In some examples, the processor of the example system is configured to execute further processor-executable instructions stored in the non-transitory computer-readable medium to: receive and store one or more chat messages received by the compliance auditing participant during the encrypted video conference, wherein the one or more chat messages are encrypted, and optionally, receive, after the encrypted video conference has ended, a request for decrypted message data from the one or more chat messages; decrypt the one or more chat messages using the cryptographic meeting key to generate the decrypted message data; and provide the decrypted message data. Additionally, the processor of the example system may be configured to execute further processor-executable instructions stored in the non-transitory computer-readable medium to: receive a request for the cryptographic meeting key; and provide, in response to the request, the cryptographic meeting key.

Another example method includes receiving, by a compliance auditing participant executing on a client device, an indication that an encrypted video conference is initiated, wherein the encrypted video conference includes a plurality of participants; automatically joining the encrypted video conference with the client device; receiving, by the compliance auditing participant from a host client device, a cryptographic meeting key distributed to each participant of the plurality of participants, wherein the compliance auditing participant is one of the plurality of participants; recording, by the compliance auditing participant, encrypted streams of audio and video from a plurality of participants in the video conference; and transmitting, by the compliance auditing participant, the encrypted audio and video to the compliance auditing server.

In some examples, the example method also includes receiving, by the compliance auditing participant, one or more chat messages exchanged during the encrypted video conference, wherein the one or more chat messages are encrypted, and optionally, transmitting, by the compliance auditing participant, the cryptographic meeting key to the compliance auditing server.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
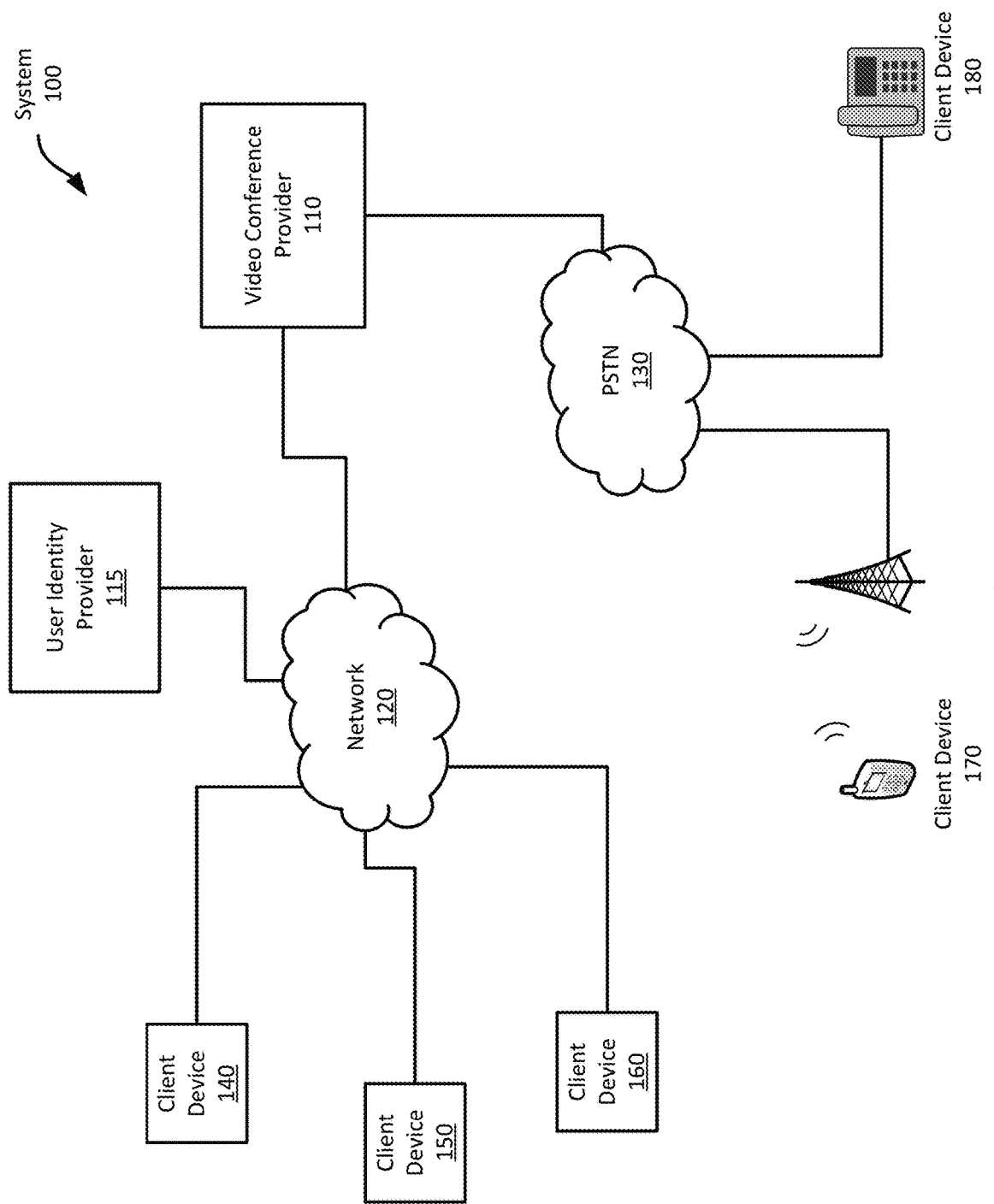
FIGS. 1-4 show example systems for compliance auditing encrypted video conferences.

Examples are described herein in the context of systems and methods for compliance auditing encrypted video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

People participate in video conferences for a wide variety of reasons, such as to keep in touch with family, conduct business, or manage groups or organizations. In some cases, participants in a video conference may wish to keep the contents of the video conference confidential and only available to certain authorized personnel. This can be done by encrypting audio and video that is streamed between participants to a video conference, which may prevent potential eavesdroppers from accessing the streamed audio and video. Without the necessary decryption information, accessing the encrypted audio and video can be prohibitively computationally difficult. However, in some scenarios, audio and video data may be decrypted by the video conference provider during the course of an encrypted video conference.

For example, some video conference providers offer the option of recording a video conference. In some examples, the video conference provider itself, being the nexus through which the audio and video traverses, will record the meeting and provide access to the recorded meeting to one or more of the participants. However, to perform this functionality, the video conference provider needs to decrypt the audio and video for recording, even if the recorded audio and video is subsequently re-encrypted. Thus, the video conference provider has access to the encrypted audio and video of the video conference. Such a scenario may be undesirable for any number of reasons. For example, the video conference provider's servers may be "untrusted" by the participants, meaning the provenance and identity of the servers may not be verifiable by the participants or may otherwise be suspect. In some cases, the audio or video may include confidential information that may not be shared with the video conference provider, e.g., by law or regulation. Further, the participants themselves may simply not want the video conference provider to have access to the content of the video conference.

To provide security for the video conference, the participants may use an option to encrypt audio and video data between the participants and distribute cryptographic information amongst the participants without sharing that cryptographic information with the video conference provider. Thus, all of the participants are able to receive encrypted audio and video and decrypt it, but while the video conference provider continues to receive the encrypted video and audio and distribute it to the participants, it is unable to decrypt it. However, this presents a problem for auditing communication between participants during an encrypted video conference.

Organizations, such as business, legal entities, or educational facilities, may want to compliance audit its participants during encrypted video conferences without impacting the security of the communication. For example, an organization may desire or be required to ensure that any communication exchanged during a video conference be in compliance with organizational policies, legal obligations, or governmental regulations and/or laws. Generally, however, searching through communications exchanged during an encrypted video conference is precluded or difficult due to the nature of the encryption, such as, for example, the video conference provider being unable to decrypt the audio and video streams from the video conference. Thus, unless a participant from the organization records the encrypted video conference, which is undesirable due to limited storage space or security reasons, a record of the communications exchanged during the video conference is not accessible by the organization.

To enable an organization to compliance audit communications exchanged during an encrypted video conference, a compliance auditing participant from the organization is joined into the encrypted video conference. The compliance auditing participant may be automatically joined to any video conference to which one or more participants from the organization join. The compliance auditing participant is treated by the other participants as one of the participants in the video conference and, as such, receives any cryptographic information associated with the encrypted video conference. Because the compliance auditing participant receives cryptographic information associated with the encrypted video conference, the organization can later access any encrypted communication from the video conference.

Encrypted communications from the video conference, such as the audio and video streams or chat message data, can be recorded and stored to provide access to the communications to the organization after the video conference is over. The organization can host or hire an compliance auditing server to record and/or store encrypted data from video conferences. To allow for auditing of the encrypted data, the compliance auditing server can generate searchable files for the organization. In some cases, the compliance auditing server also stores the cryptographic information received by the compliance auditing participant. Thus, when the organization requests to audit encrypted communications at a later time, the compliance auditing server can decrypt any encrypted communications and provide the decrypted data to the organization for auditing.

Using such techniques allows hosts and participants in a video conference to enjoy privacy for their communications and ensure that access to any communications exchanged during a video conference is similarly restricted, while allowing organizations access to the communication to ensure compliance with various policies.

This illustrative example is given to introduce the reader to the general subject matter discussed herein and the disclosure is not limited to this example. The following sections describe various additional non-limiting examples and examples of systems and methods for compliance auditing encrypted video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
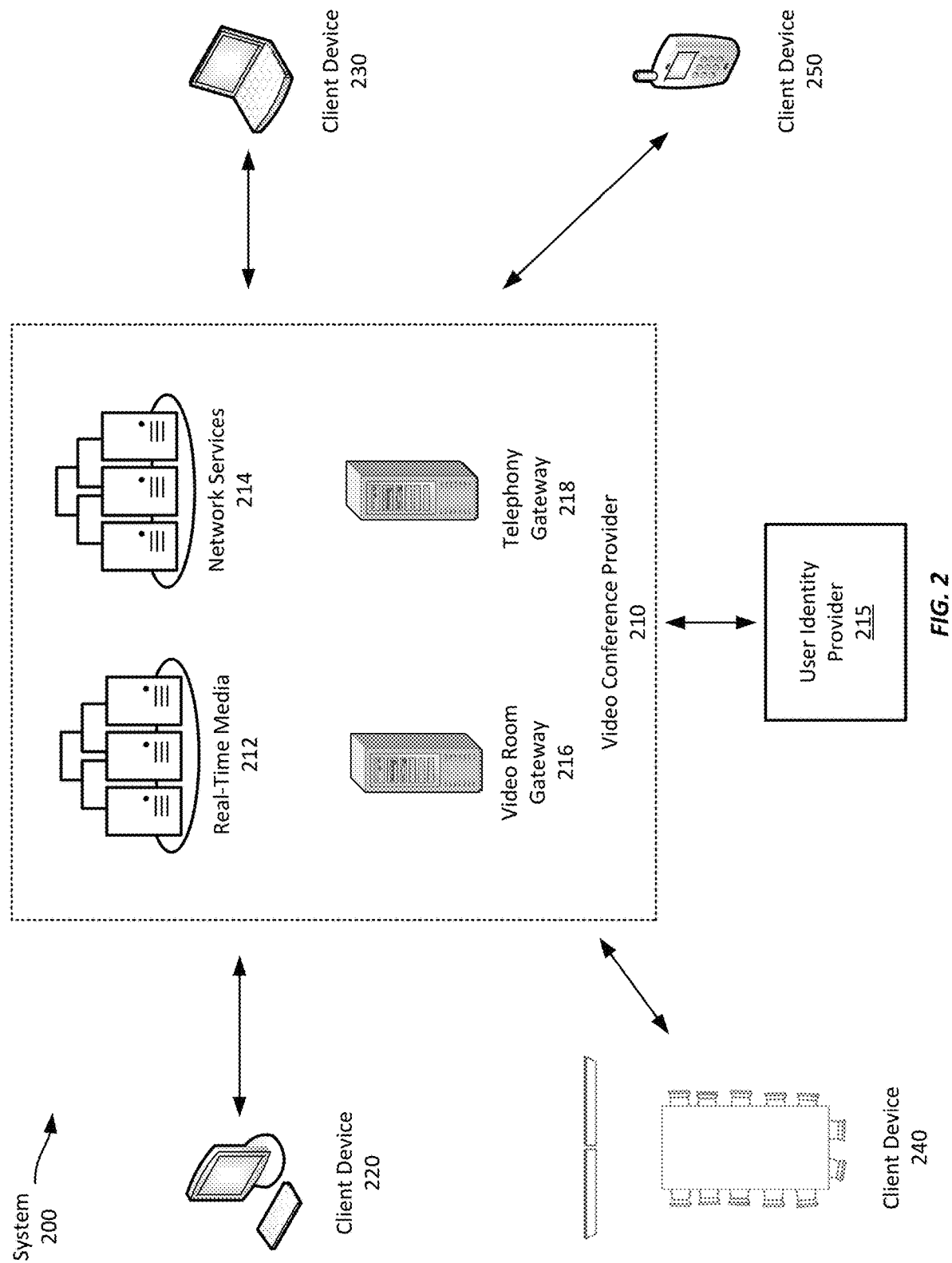

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 220-250 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
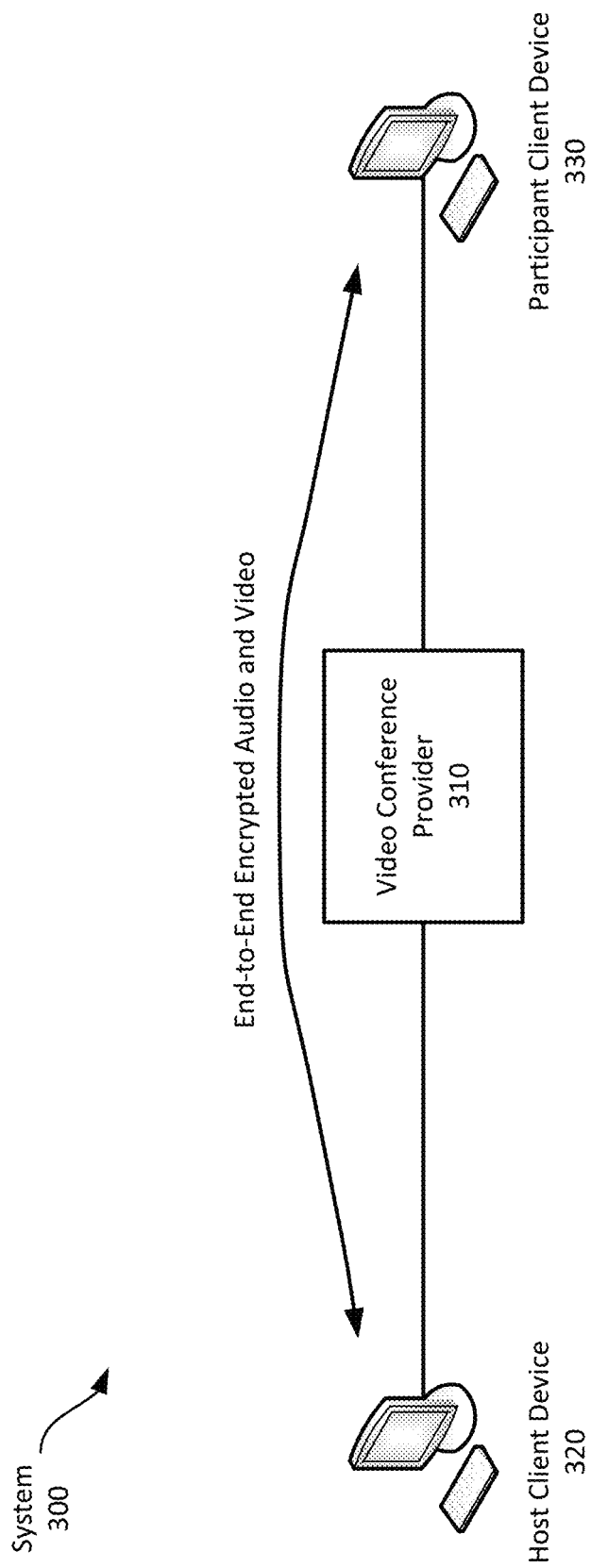

Referring now to FIG. 3, FIG. 3 illustrates a simplified system 300 that enables the users to engage in an end-to-end ("E2E") encrypted video conference. The system includes two client devices 320, 330 and a video conference provider 310. The client devices 320, 330 are connected to the video conference provider 310 through one or more communication networks (not shown), generally as described above with respect to FIGS. 1 and 2. Client devices 320, 330 may be associated with different organizations or the same organization.

In an E2E-encrypted video conference, each participant joins the video conference with their respective client device 320-330 and the host establishes a meeting key, e.g., a symmetric cryptographic key, that will be used to encrypt and decrypt the audio and video streams. Each of the participants also has their own respective public/private key pair that can be used to communicate with the respective participant and each participant's public key is published or distributed in any suitable manner, such as by registering it with a trusted entity or by generating a cryptographic signature using a private key and allowing the host or other participants to use a published copy of the public key to verify the signature.

Once each participant's public key has been verified, the host can securely distribute the meeting key to the participants by encrypting the meeting key using the participant's respective public keys. For example, the host may generate and send an encrypted message including the meeting key to each participant using the respective participant's public key. Upon receiving successfully decrypting the meeting key, the respective participants are then able to encrypt and decrypt meeting content.

In system 300 shown in FIG. 3, client device 320 initially connects to the video conference provider 310 and requests that the video conference provider 310 create a new meeting. Once the meeting is created, client device 320 is designated as the host of the meeting and establishes a meeting key to use to provide for E2E encryption in the meeting, but does not provide it to the video conference provider 310. Subsequently, a participant client device 330 joins the meeting and generates and provides a cryptographically signed message using its private key to the host client device 320, which verifies the message using the participant's public key. After verifying the public key, the host client device 320 encrypts the meeting key using the participant's public key and transmits it to the participant client device 330, which decrypts the meeting key. Once the meeting key has been successfully received and decrypted by the participant client device 330, it may begin transmitting encrypted audio and video using the meeting key.

In this example, each participant generates a per-stream encryption key by computing a new key using a non-secret stream ID for each data stream it transmits (e.g., audio and video), and uses the corresponding stream encryption key to encrypt its audio and video stream(s). The video conference provider receives the various encrypted streams, multiplexes them generally as described above with respect to FIGS. 1 and 2, and distributes them to the various participating client devices 320, 330. The respective client devices 320, 330 can then use the meeting key to decrypt the incoming streams and view the content of the video conference.

However, as part of this process, the video conference provider 310 does not have access to the meeting key. Thus, the video conference provider 310 is unable to decrypt the various audio and video streams. But because the individual streams are separately received from the various participants, the video conference provider 310 is able to identify the source of each stream and therefore it can properly multiplex the streams for delivery to each participant.

A consequence of the video conference provider 310 lacking access to the meeting key is that it cannot decrypt the audio and video streams to record them. Further, and as alluded to above, the meeting key is discarded by the various clients once the meeting has ended. Thus, recording meetings in an E2E-encrypted meeting becomes problematic. If a meeting is not recorded, then an organization cannot review or audit communication data from the video conference after the video conference is over.

In some cases, an organization may not want the video conference provider 310 to record video and audio streams from the E2E-encrypted meeting. Instead, the organization may join a compliance auditing participant into the E2E-encrypted meeting on its behalf. It should be appreciated that the term "join" used herein can also mean "add," "allow to join," "accept," and the like. The compliance auditing participant can record the video and audio streams from the encrypted meeting and provide the encrypted streams of audio and video to the organization for auditing and review purposes. The compliance auditing participant is discussed in greater detail with respect to FIG. 4.

Figure 4:
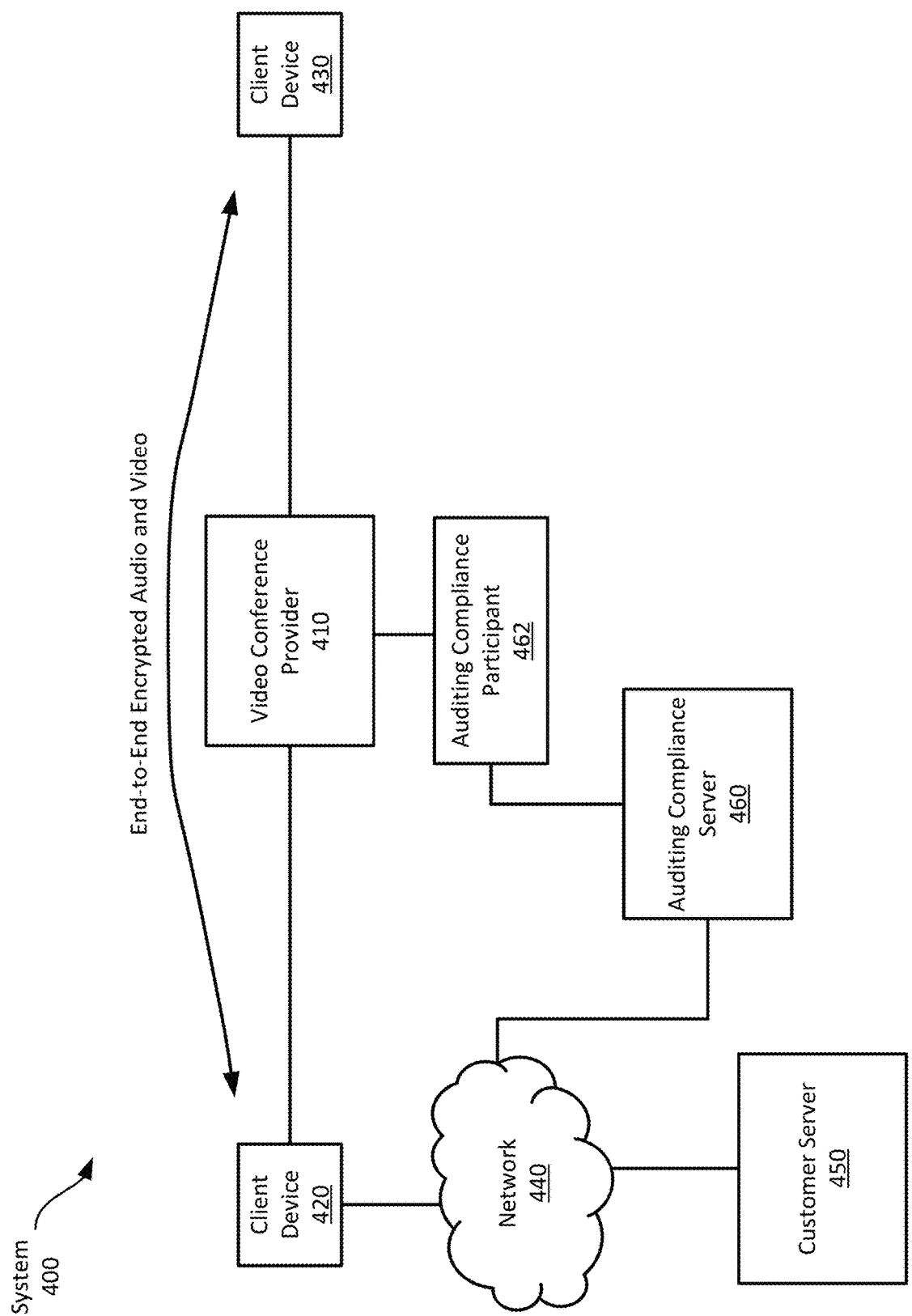

FIG. 4 shows another example system 400 for compliance auditing encrypted video conferences. In this example, the host's client device 420 is connected to a private network 440 within the host's company or organization, which is a customer of the video conference provider 410. The organization also maintains a server 450 that can provide encryption key information and can perform decryption and encoding functionality on audio and video.

In this example, the organization also maintains a compliance auditing server 460. The compliance auditing server 460 can be run on premise or could be a cloud-based server. Regardless of the physical location of the server, the compliance auditing server 460 is controlled by the organization and not visible or accessible by the video conference provider 410. The compliance auditing server 460 is connected to the private network 440 within the host's company or organization and provides compliance auditing of video conferences for the host's company or organization.

In some examples, the compliance auditing server 460 can be hired out by the organization. For example, due to the cost of maintaining the compliance auditing server 460, the organization may hire the video conference provider 410 or other service provider to maintain and run the compliance auditing server 460. In such examples, the compliance auditing server 460 can be located and owned by either the organization or the video conference provider 410, however, only the organization has access to the data stored by the compliance auditing server 460. In other words, while the video conference provider 410 runs and maintains the compliance auditing server 460, the video conference provider 410 cannot access the data written and stored within the compliance auditing server 460. Thus, while the video conference provider 410 may have physical access to the compliance auditing server 460, the video conference provider 410 does not have access to data stored within the compliance auditing server 460. Only the organization and agents of the organization may have access to the data stored within the compliance auditing server 460. Thus, it should be appreciated that the term "access" can mean "access to stored data" herein.

To provide compliance auditing of video conferences, the compliance auditing server 460 receives an indication that a client device associated with the organization, such as the host's client device 420, is joining a video conference. The video conference may be an encrypted video conference as discussed herein. The compliance auditing server 460 can receive the indication that the host's client device 420 is joining the encrypted video conference via the private network 440. For example, when the host's client device 420 accesses the video conference provider 410, it will communicate with the private network 440, which will in turn notify (e.g., provide indication to) the compliance auditing server 460. It should be appreciated that the compliance auditing server 460 may receive an indication of the host's client device 420 involvement with the encrypted video conference via other means. For example, the compliance auditing server 460 can receive the indication by means of receiving a meeting invitation automatically whenever the host's client device 420 sends or receives a meeting invitation. In another example, the indication can be received by means of a notification from the video conference provider 410 or the host's client device 420 when the host's client device 420 accesses the video conference provider 410. It should be appreciated that while this example is discussed with respect to the host's client device 420, any client device associated with the organization may also be used.

Responsive to the indication that the host's client device 420 is joining the encrypted video conference, the compliance auditing server 460 requests to join a compliance auditing participant 462 to the encrypted video conference. The compliance auditing participant 462 may be a software based application, such as a video conferencing software application that has been modified to join identified meetings and automatically record audio, video, text chat messages, etc. exchanged during the meeting, that is running on the compliance auditing server 460 that joins any encrypted video conference in which a client device associated with the organization, such as the host's client device 420 joins. In some cases, the compliance auditing participant 462 is a software based application executed by the host's client device 420 (or any client or computing device associated with the organization). The compliance auditing participant 462 joins an encrypted video conference along with the host's client device 420 to record and provide the organization access to the encrypted streams of audio and video exchanged after the video conference is over.

The compliance auditing participant 462 can be automatically joined to the encrypted video conference when the host's client device joins the encrypted video conference. For example, the host's client device 420's request to join the encrypted video conference may include the request to join the compliance auditing participant 462. Alternatively, the compliance auditing participant 462 (or an instance of the compliance auditing participant 462) may automatically join the meeting at a scheduled start time. When the host's client device 420 joins the encrypted video conference, the compliance auditing server 460 may automatically join the compliance auditing participant 462 along with the host's client device 420 to the encrypted video conference.

In this example, when the host's client device 420 establishes the meeting, the host's client device 420 generates and distributes the meeting key generally as discussed above with respect to FIG. 3. The meeting key may be a symmetric cryptographic meeting key. The meeting key is distributed to all the participants of the encrypted video conference, including the compliance auditing participant 462. Because the compliance auditing participant 462 is treated as one of the participants, the compliance auditing participant 462 also receives the cryptographic meeting key. The compliance auditing participant 462 is treated as any other participant by the video conference provider 210 and maintains the functionality of one of client devices 220-250 as discussed above with respect to FIGS. 2 and 3. Thus, the compliance auditing participant 462 receives the encrypted streams of audio and video from the encrypted meeting conference distributed by the video conference provider 410. Upon receipt of the cryptographic meeting key, the compliance auditing participant 462 may transmit the cryptographic meeting key to the compliance auditing server 460, which in turn, may receive and store the cryptographic meeting key in a record in a data store associated with the meeting.

As noted above, the compliance auditing participant 462 receives the encrypted streams of audio and video from the encrypted video conference. In this example, the compliance auditing participant 462 also records the encrypted streams of audio and video from the E2E-encrypted meeting. The compliance auditing participant 462 may act as a cloud-based recorder to record the encrypted streams of audio and video. In some examples, the compliance auditing participant 462 may request the video conference provider 410 to record the encrypted streams of audio and video. In such examples, the video conference provider 410 transmits the recorded encrypted streams of audio and video to the compliance auditing server 460. Because the video conference provider 410 does not have access to the cryptographic meeting key, the video conference provider 410 cannot decrypt the encrypted streams of audio and video. Thus, the encrypted video conference maintains privacy and security for its participants.

The encrypted streams of audio and video recorded by the compliance auditing participant 462 may be stored on the client device that is providing the compliance auditing participant 462 and later forwarded to the compliance auditing server 460, or it may be immediately transmitted to the compliance auditing server 460, and in turn received and stored by the compliance auditing server 460. In addition to providing the encrypted streams of audio and video to the compliance auditing server 460, the compliance auditing participant 462 also receives one or more chat messages exchanged by the participants during the meeting. The one or more chat messages are also encrypted using the meeting key. Upon receipt of the one or more chat messages, the compliance auditing participant 462 may also transmit the one or more chat messages to the compliance auditing server 460, which in turn, receives and stores the one or more chat messages.

In some cases, if more than one compliance auditing participant 462 associated with different organizations join the encrypted video conference, each respective compliance auditing participant 462 records its own copy of the encrypted streams of audio, video, chat messages, etc. However, in some cases, several of the organizations may contract with a cloud service provider, such as the video conference provider 410, to store the recordings. To reduce storage usage, the cloud service provider may detect that multiple recordings are being made of the same meeting and may only store a single copy of the recording, but also associate it with each of the organizations for them to individually access. For example, if a first compliance auditing participant 462 associated with a first organization joins the encrypted video conference, and a second compliance auditing participant 462 associated with a second organization joins the same encrypted video conference, both compliance auditing participants 462 may receive the same encrypted streams of audio and video. If both the organizations hire out the compliance auditing server 460 to the video conference provider 410, the video conference provider 410 may only store one recording of the encrypted streams of audio and video to minimize storage space. While either organization can access the encrypted streams of audio and video, the encrypted streams of audio and video may only be written to the compliance auditing server 460 once.

In some examples, the encrypted streams of audio, video, chat messages, and the like, may be stored by one entity (e.g., the video conference provider 410) while the meeting keys are stored by second entity (e.g., the compliance auditing server 460). By storing the encrypted data separately from the meeting keys, this can allow the compliance auditing server 460 to have minimal data storage requirements without compromising data security.

Once the meeting is over, the customer's server 450 can request the decrypted recording of the encrypted streams of audio and video from the compliance auditing server 460. Upon receiving the request, the compliance auditing server 460 can decrypt the encrypted meeting recording using the cryptographic meeting key and provide a decrypted meeting recording to the customer's server 450. Additionally, after decrypting the encrypted streams of audio and video, the compliance auditing server 460 may encode the decrypted streams of audio and video, e.g., as an mp4 file, to reduce the amount of raw data from the video and audio that must be transferred to the organization.

The compliance auditing server 460 allows the organization to maintain control over the recording because only the compliance auditing server 460, which is either hosted or hired by the organization (e.g., customer), can decrypt the encrypted meeting recording itself. As discussed above the video conference provider 410 is not provided with a copy of the meeting key(s) used during the meeting. Further, it enables the customer to push computationally expensive processing to dedicated resources, such as a cloud environment, where the decryption and video/audio encoding can be performed, and it can store the decrypted, encoded recording at any suitable secure location for later retrieval by authorized personnel. Because this process is performed by the compliance auditing server 460 (or other of the customer's computing resources), rather than one of the participants or the video conference provider 410, the customer is able to maintain control over the meeting recording and only allow access by appropriate personnel within the customer's organization.

Figure 5:
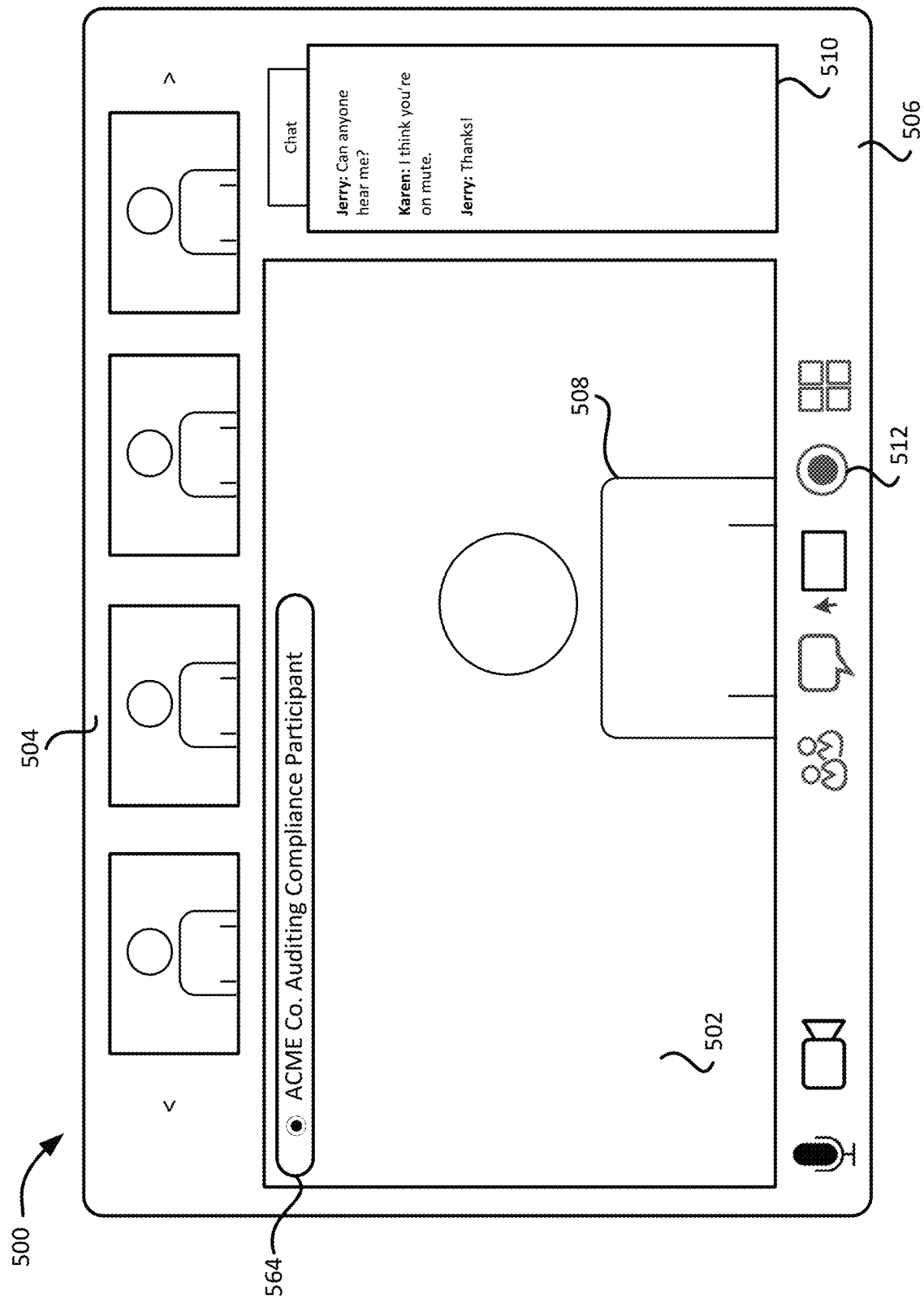
FIG. 5 shows an example graphical user interface for compliance auditing encrypted video conferences.

Referring now to FIG. 5, FIG. 5 shows an example graphical user interface (GUI) 500 for a video conference such as an encrypted video conferences as described herein. The GUI 500 of FIG. 5 will be described with respect to the systems shown in FIG. 4; however any suitable system according to this disclosure may be employed, including any of the systems shown in FIGS. 1-3.

In some embodiments, a GUI 500 is viewable to a participant of the video conference on the participant's device, for example the client device 420. Presentation of the GUI 500 on the participant's device may be in response to the initiation of the video conference.

The GUI 500 may include a roster 504 of a plurality of participants of the video conference. The roster 504 may include a video stream of the plurality of participants. In other embodiments, the roster 504 may include a picture, image, representation, or a listing of the plurality of participants. When a participant joins the video conference, the joining participant is added to the roster 504.

Upon initiation of a video conference, a compliance auditing participant 462 is joined to the video conference. The compliance auditing participant 462 may be automatically joined to the video conference upon initiation of the video conference. In some embodiments, the compliance auditing participant 462 is manually joined to the video conference. For example, the meeting host or one or more participants of the video conference may receive a prompt requesting permission to join compliance auditing participant 462 to the video conference. If the request is granted, then compliance auditing participant 462 is joined to the video conference. If the request is denied, an indication of the denial may be sent to the customer server 450 for client compliance purposes. In some examples, the compliance auditing participant 462 may attempt to join immediately upon the meeting starting, and depending on the security settings for the meeting, may be automatically allowed to join or may require admission from the host, as discussed above.

Upon joining the video conference, the compliance auditing participant 462 may be added to a meeting roster 504. The meeting roster 504 provides an indication of the one or more participants of the video conference. For example, the meeting roster 504 may provide the identity of each participant of a plurality of participants. The meeting roster 504 may be a listing of the identity (e.g., name) of the participants or the meeting roster 504 may provide an image or video stream of the participant. Similar to the compliance auditing participant 462, when a participant joins the video conference, the participant is added to the meeting roster 504. In embodiments when the meeting roster 504 encompasses an image or video stream of participants, an indication of the compliance auditing participant 462 may be added to the GUI 500. For example, an indication 564 of the compliance auditing participant 462 may be provided on a video stream 502, which may occur when the compliance auditing participant 462 begins recording the meeting. The compliance auditing participant 462 may automatically record the meeting upon joining the meeting. The video stream 502 is the live video stream of an active participant 508.

In some examples, the compliance auditing participant 462 may not be visible to a portion of or any of the participants of the video conference. In some cases, the compliance auditing participant 462 may be visible to only participants associated with the organization corresponding to the compliance auditing participant 462. The visibility of the compliance auditing participant 462 may depend on applicable laws, regulations, and rules governing the organization, participants, and/or the video conference provider 410.

During the video conference, participants of the video conference send and receive video and audio streams. If the video conference is encrypted, then the video and audio streams received may be encrypted streams. Each participant may receive a meeting cryptographic key which, as discussed above, allows access for the participants to the encrypted streams of video and audio.

The compliance auditing participant 462 is treated as one of the participants of the video conference. For example, the compliance auditing participant 462 obtains the meeting cryptographic key and receives the encrypted streams of audio and video as though it were any other participant in the meeting. In some embodiments, the meeting cryptographic key obtained by the compliance auditing participant 462 is transmitted to and stored by the compliance auditing server 460 and associated with a recording of the meeting.

Another manner in which the compliance auditing participant 462 is treated as one of the participants of the video conference is that the compliance auditing participant 462 receives any chat messages sent between the plurality of participants during the video conference. GUI 500 includes a chat box 510 which allows participants of the video conference to message one another during a video conference. Any chat messages sent or received by a participant during the video conference are received by the compliance auditing participant 462 as well.

Upon receipt of the chat messages by the compliance auditing participant 462, the compliance auditing server 460 can store the respective encrypted chat message data. In this manner, the organization can log into the compliance auditing server 460 and, using the meeting key obtained by the compliance auditing participant 462 and stored in the compliance auditing server 460, decrypt the encrypted chat message data for review and auditing. Since the compliance auditing server 460 is not run on the video conference provider 410 infrastructure and/or the video conference provider 410 does not have access to the meeting key, the message data is secure and private.

In some cases, a third party may decrypt and/or audit the encrypted message data for the organization. In such cases, the compliance auditing server 460 can pull down the encrypted chat message data and send the data to the third party, along with the cryptographic meeting key for decryption and auditing. In some cases, the compliance auditing server 460 decrypts the message data and only sends the decrypted message data to the third party for auditing. A similar approach may be used for the decryption and auditing of the encrypted audio and video streams (e.g., a third party can decrypt and/or audit the audio and video streams stored by the compliance auditing server 460). In both cases, the compliance auditing server 460 can encode any decrypted material (e.g., the streams of audio and video or chat message data) to a suitable format, and store the decrypted material (encoded or not) onto a data store, such as its own.

As illustrated, GUI 500 includes a dashboard 506 containing one or more action selections. For example, dashboard 506 includes a recording selection 512 that allows a participant to record the streams of audio and video during the video conference. In some embodiments, the compliance auditing participant 462 receives notification of a selection of one or more of the action selections. For example, if a participant records the streams of audio and video by selecting the recording selections, the compliance auditing participant 462 receives a notification that the participant is recording and may transmit such information to the compliance auditing server 460 to be logged.

Figure 6:
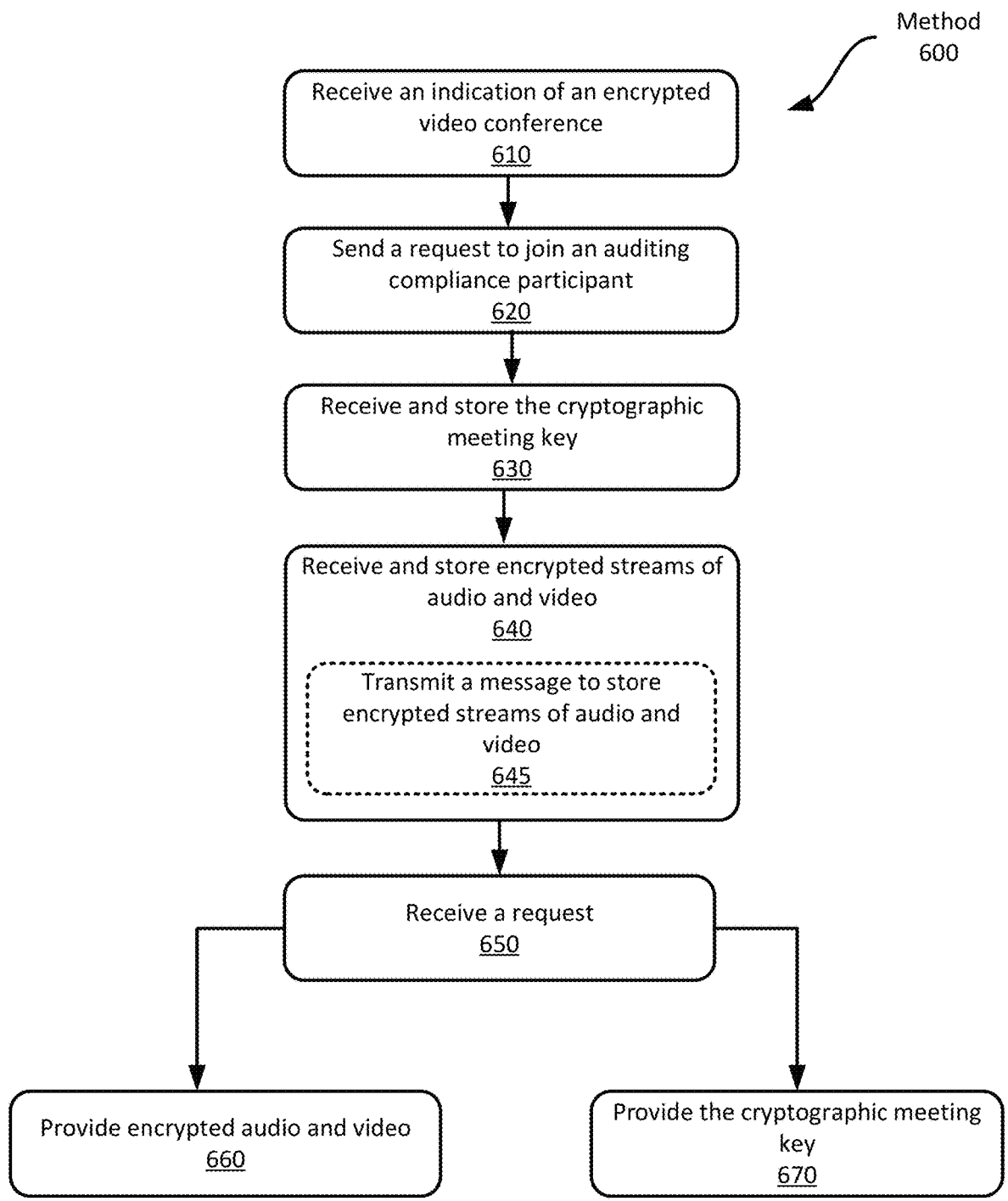
FIGS. 6-9 show example methods for compliance auditing encrypted video conferences.

Referring now to FIG. 6, FIG. 6 shows an example method 600 for compliance auditing an encrypted video conference. The method 600 of FIG. 6 will be described with respect to the systems shown in FIGS. 4 and 5; however any suitable system according to this disclosure may be employed, including any of the systems shown in FIGS. 1-3.

At block 610, the compliance auditing server 460 receives an indication that an encrypted video conference is initiated. The compliance auditing server 460 may receive the indication when a client device associated with the organization joins the encrypted video conference. In some examples, the compliance auditing server 460 may receive the indication when the scheduled meeting starts.

Initiation of the encrypted video conference may be performed by the video conference provider 410 in response to receipt of a request from the host's client device 420 to initiate an encrypted video conference. The request may identify certain meeting information, such as a meeting identifier and passcode. It may also include one or more options for the meeting, including an option to employ E2E encryption. Alternatively, the request to employ E2E encryption may be sent separately from the request to initiate the meeting.

At block 620, upon receiving the indication of initiation of the encrypted video conference, the compliance auditing server 460 sends a request to the video conference provider 410 join the compliance auditing participant 462 to the encrypted video conference. The request may be sent upon the client device associated with the organization joining the encrypted video conference. In some cases, the joining of the client device and the requesting to join the compliance auditing participant 462 to the encrypted video conference may be done simultaneously. The compliance auditing participant 462 may be automatically joined to the encrypted video conference in response to the request from the compliance auditing server 460.

Optionally, upon joining the encrypted video conference, an indication of the compliance auditing participant 462 may be provided on a GUI 500 to indicate to the participants of the encrypted video conference that the compliance auditing participant 462 has joined the meeting. For example, upon joining the compliance auditing participant 462 to the encrypted video conference, the indication 564 may appear, highlight, or otherwise indicate on the GUI 500 that the compliance auditing participant 462 has joined the encrypted video conference. In some cases, the indication 564 may include the compliance auditing participant 462 appearing on the meeting roster 504. A participant can select the indication 564 and view information relating to the compliance auditing participant 462, such as, for example, the organization associated with the compliance auditing participant 462.

In one example, more than one compliance auditing participant 462 may be joined to the encrypted video conference. For example, in a meeting where participants from multiple organizations are attending, some or all of the organizations may use their own compliance auditing server. Thus, a first compliance auditing participant 462 may be associated with a first organization and a second compliance auditing participant 462 may be associated with a second organization, and so forth. In such an example, two indications 564 can be provided in the GUI 500 as described above. By selecting an indication 564, a participant can view which organization the selected compliance auditing participant 462 is associated with.

Prior to or upon initiation of the encrypted video conference the host's client device 420 obtains a meeting cryptographic key. Any suitable technique for generating a meeting cryptographic key may be employed. For example, the meeting cryptographic key may include a cryptographic key pair generated according to any suitable cryptographic key pair technique, such as using elliptic curves. In some examples, the meeting cryptographic key may be a single symmetric cryptographic key. The host's client device 420 may distribute the cryptographic meeting key to the participants of the encrypted video conference generally as discussed above with respect to FIG. 3.

At block 630, the compliance auditing server 460 may receive and store the cryptographic meeting key associated with the encrypted video conference. As noted above, the host's client device 420 distributes the cryptographic meeting key to the participants of the encrypted video conference. The compliance auditing participant 462 is treated as one of the participants, and as such, receives the cryptographic meeting key. Upon receipt of the cryptographic meeting key, the compliance auditing participant 462 may transmit the cryptographic meeting key to the compliance auditing server 460, which in turn stores the cryptographic meeting key.

At block 640, the compliance auditing server 460 receives and stores the encrypted streams of audio and video from the encrypted video conference. For example, the host's client device 420 begins encrypting audio and video obtained from its microphone and video capture device using the meeting cryptographic key, as do the other participants.

During the encrypted video conference, the video conference provider 410 receives the encrypted streams of audio and video from various participants of the meeting and distributes the encrypted streams of audio and video to the other participants in the meeting. For example, the host's client device 420 transmits the encrypted audio and video to the video conference provider 410, where, in turn, the video conference provider 410 distributes the encrypted audio and video from the host's client device 420 to the other participants. The host's client device 420 also begins to receive encrypted streams of audio and video via the video conference provider 410 from the other participants. It should be appreciated that the functionality at block 640 continues throughout the video conference. In this way, any streams of audio and video transmitted between the participants is encrypted. Because the compliance auditing participant 462 is treated as a participant, the compliance auditing participant 462 receives the encrypted streams of audio and video distributed during the meeting. Upon receipt of the encrypted streams of audio and video the compliance auditing participant 462 may transmit the encrypted streams to the compliance auditing server 460, which in turn receives and stores the encrypted streams of audio and video. In some examples, the compliance auditing participant 462 may automatically record the encrypted streams of audio and video as it receives the streams. In some such examples, the compliance auditing server 460 receives and stores the recorded encrypted streams of the audio and video from the compliance auditing participant 462.

At optional block 645, the compliance auditing server 460 may transmit a message to the video conference provider 410 to store encrypted streams of audio and video. As noted above, the video conference provider 410 receives all the encrypted streams of audio and video exchanged between participants during the encrypted video conference. In some examples, the compliance auditing server 460 may be hosted or managed by the video conference provider 410, or may employ the video conference provider 410 as a data storage cloud server. In such cases, the video conference provider 410 may store the encrypted streams of audio and video as they are received during the encrypted video conference. In some cases, the video conference provider 410 may record the encrypted streams of audio and video as they are received and then store them to a cloud storage area accessible by the compliance auditing server 410. Because the video conference provider 410 does not have access to the meeting key, the video conference provider 410 is unable to decrypt the stored encrypted streams of audio and video. In this manner, participants of the encrypted video conference can enjoy privacy and security during their communications.

At block 650, the compliance auditing server 460 receives a request for a portion of the stored encrypted streams of audio and video. The compliance auditing server 460 may receive the request after the encrypted video conference is ended. In this example, the request may be sent by the organization; while in other examples, the request may be sent by a third party hired by the organization for compliance auditing purposes. Some examples may require the requesting party to provide credentials, such as a username and password, to obtain the recorded audio, video, chat messages, etc.

At block 660, the compliance auditing server 460 provides the requested portion of the encrypted audio and video streams to the requesting entity (e.g., organization or third party).

The request at block 650 may also include a request for the cryptographic meeting key. In such cases, at block 670, the compliance auditing server 460 provides the cryptographic meeting key to the requesting entity.

It should be appreciated that the method 600 described above is only one example according to this disclosure. In other examples, the blocks described above may be performed in a different order or one or more blocks may be omitted. For example, the order of blocks 620-660 may occur in any suitable order according to different examples.

Figure 7:
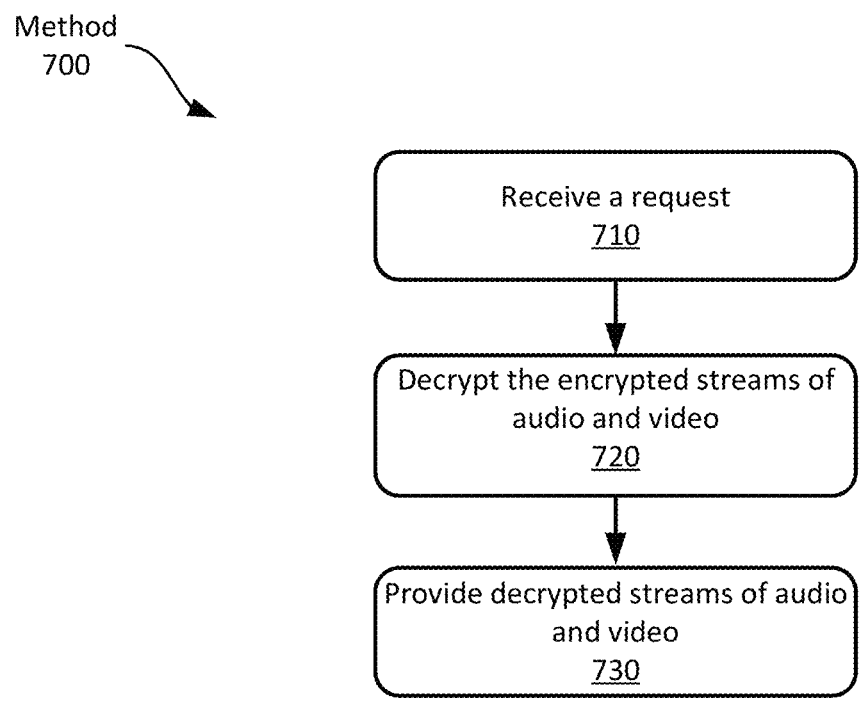

Referring now to FIG. 7, FIG. 7 shows an example method 700 for compliance auditing encrypted video conferences. The method 700 of FIG. 7 will be described with respect to the systems shown in FIG. 4; however any suitable system according to this disclosure may be employed, including any of the systems shown in FIG. 1-3 or 5. In some cases, method 700 may be a sub-method of method 600 shown in FIG. 6. In specific examples, method 700 may be a sub-method of block 650.

At block 710, the compliance auditing server 460 receives a request for decrypted streams of audio and video from the encrypted video conference. The request may be sent by a member of the organization, an automated auditing or compliance software application, or a third party which the organization hired for compliance auditing purposes. For example, the compliance auditing server 460 may automatically decrypt meeting recordings after a meeting has concluded based on an indication that the meeting has concluded.

At block 720, the compliance auditing server 460 decrypts the encrypted streams of audio and video upon receipt of the request. The compliance auditing server 460 decrypts the encrypted streams of audio and video using the cryptographic meeting key, which may also be stored by the compliance auditing server 460. At block 730, the compliance auditing server 460 provides the decrypted streams of audio and video to the requesting entity.

At optional block 740, the compliance auditing server 460 encodes the decrypted streams of audio and video into a suitable format, and stores the decrypted audio and video (encoded or not) onto a data store, such as its own local data store or at a remote computing device, e.g., customer server 450. In an example, compliance auditing server 460 generates an MP4 file of the decrypted streams of audio and video. In examples, the organization or third party may request the decrypted streams of audio and video for review and auditing purposes. In response to such a request, the compliance auditing server 460 may send the decrypted stream of audio and video by, for example, sending the generated file of the decrypted streams of audio and video. The compliance auditing server 460 may also store the generated file to reduce the storage space of the encrypted streams of audio and video.

It should be appreciated that the method 700 described above is only one example according to this disclosure. In other examples, the blocks described above may be performed in a different order or one or more blocks may be omitted.

Figure 8:
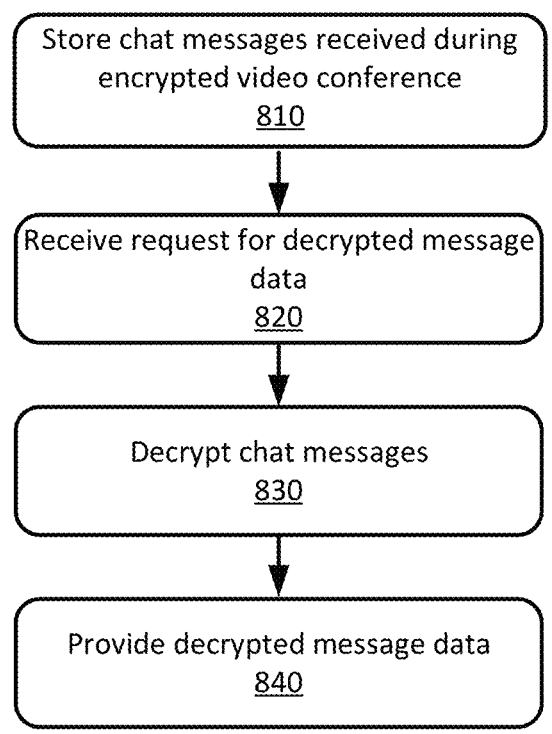

Referring now to FIG. 8, FIG. 8 shows an example method 800 for compliance auditing encrypted video conferences. The method 800 of FIG. 8 will be described with respect to the systems shown in FIG. 4; however any suitable system according to this disclosure may be employed, including any of the systems shown in FIG. 1-3 or 5. In some cases, method 800 may be a sub-method of method 600 shown in FIG. 6.

At block 810, the compliance auditing server 460 receives and stores encrypted message data. The encrypted message data may include any chat messages, text, documents, or other communication that is not audio or video exchanged between participants during the video conference. Because the compliance auditing participant 462 is treated as a normal participant of the encrypted video conference, the compliance auditing participant 462 receives any chat messages exchanged by the participants during the meeting. The compliance auditing participant 462 then transmits the message data to the compliance auditing server 460 for storage, which the compliance auditing server 460 stores and associates with the meeting, the meeting key(s), and any recorded encrypted audio and video. Due to the encrypted nature of the meeting, the message data is also encrypted.

At block 820, after the meeting conference has ended, the compliance auditing server 460 receives a request for decrypted message data. The request may be made by the organization or a third party hired by the organization for compliance auditing purposes.

At block 830, the compliance auditing server 460 decrypts the chat messages using the cryptographic meeting key to generate decrypted message data. Similar to the decrypted streams of audio and video, the compliance auditing server 460 may encode the decrypted message data to any suitable format, if needed.

At block 840, the compliance auditing server 460 provides the decrypted message data to the requesting entity (e.g., the organization or third party). In some cases, the compliance auditing server 460 provides the decrypted and encoded message data in a suitable format for transmission to the requesting entity.

Although not illustrated, in some embodiments more than one compliance auditing participant 462 is joined to a video conference, which may involve the use of multiple compliance auditing servers 462. In some such cases, each of the compliance auditing servers 460 may perform one or more of blocks of methods 600, 700, and/or 800. For example, as part of method 600 a second compliance auditing server 460 may request to join a second compliance auditing participant 462 to the encrypted video conference at block 620. The second compliance auditing participant 462 is treated as a participant of the encrypted video conference and receives the cryptographic meeting key, which is in turned stored by the second compliance auditing server 460. For the purposes of this disclosure, the second compliance auditing participant 462 and respective second compliance auditing server 460 are the same as the compliance auditing participant 462 and the compliance auditing server 460, discussed herein. In some cases, the second compliance auditing participant 462 and second compliance auditing server 460 are associated with a different organization than the compliance auditing participant 462 and the compliance auditing server 460. It should be readily appreciated that any number of compliance auditing participants can be joined to an encrypted video conference according to the systems and methods described herein. It should also be appreciated that a single compliance auditing server 462 may interact with multiple compliance auditing participants 460. In some such examples, the compliance auditing server 462 may execute one or more blocks of methods 600, 700, or 800 concurrently for different compliance auditing participants 460.

Figure 9:
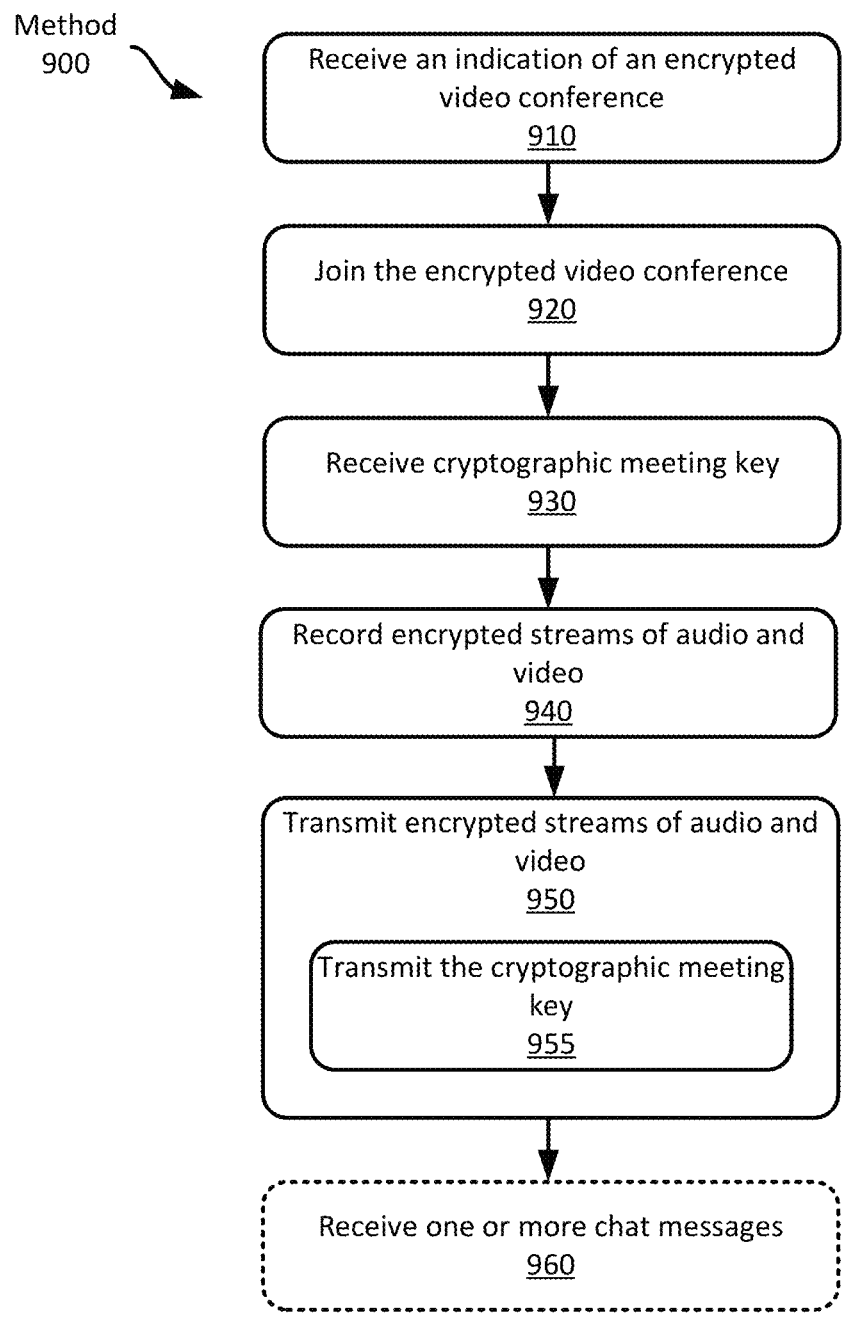

Referring now to FIG. 9, FIG. 9 shows an example method 900 for compliance auditing encrypted video conferences. The method 900 of FIG. 9 will be described with respect to the systems shown in FIG. 4; however any suitable system according to this disclosure may be employed, including any of the systems shown in FIG. 1-3 or 5.

At block 910, the compliance auditing participant 462 receives an indication of an encrypted video conference. The indication of the encrypted video conference can be a meeting invite for a scheduled meeting or a notification that the encrypted video conference has started. The indication of the encrypted meeting conference may identify certain meeting information, such as a meeting identifier and passcode.

At block 920, the compliance auditing participant 462 joins the encrypted video conference. Joining the meeting may be done in response to the compliance auditing participant 462 sending a request to the encrypted video conference. The request to join the compliance auditing participant 462 can be sent either before initiation of the encrypted video conference or upon initiation of the encrypted video conference. In some embodiments, the compliance auditing participant 462 only joins the meeting if a client device from the organization associated with the compliance auditing participant 462 also joins the encrypted video conference.

At block 930, the compliance auditing participant 462 receives a cryptographic meeting key. Prior to or upon initiation of the encrypted video conference the compliance auditing participant 462 obtains the cryptographic meeting key. The cryptographic meeting key may be distributed by the host's client device 420 upon initiation of the encrypted meeting. The compliance auditing participant 462 may pass along the meeting key to the compliance auditing server 460. As noted above, the cryptographic meeting key can be generated by the host's device 420 using any suitable technique for meeting cryptographic key generation. In some examples, the compliance auditing server 460 may also receive indications identifying when the meeting cryptographic key began being used, e.g., by providing a corresponding timestamp. Such additional information may also be stored and associated with the meeting cryptographic key and resulting encrypted audio and video received at future steps.

At block 940, the compliance auditing participant 462 receives the encrypted streams of audio and video. The compliance auditing participant 462 may also record the encrypted streams of audio and video as they are received. In some examples, the compliance auditing participant 462 may be a cloud-based application.

At block 950, the compliance auditing participant 462 transmits the encrypted audio and video streams to the compliance auditing server 460. In some cases, as the compliance auditing participant 462 records the encrypted audio and video streams, the compliance auditing participant 462 may transmit them to the compliance auditing server 460 for storing. Alternatively, the compliance auditing participant 462 may not record the encrypted audio and video streams, but may transmit them to the compliance auditing server 460 to be stored. In some examples where the compliance auditing participant 462 is executed by the compliance auditing server 460, the compliance auditing participant 462 may transmit the encrypted audio and video streams by storing them on a storage device associated with the compliance auditing server 460.

Further, as discussed above, in some examples, the compliance auditing participant 462 may be executed on a client device internally at the organization, but the encrypted audio, video, chat messages, etc. may be stored on a cloud server, e.g., at the video conference provider 410. In some such examples, the compliance auditing participant may transmit to a cloud storage server that provides compliance auditing server 460 functionality, including storing the encrypted audio, video, etc. streams.

At block 955, the compliance auditing participant 462 may also transmit the cryptographic meeting key to the compliance auditing server 460. In some examples, the compliance auditing participant 462 may transmit the cryptographic meeting key to the compliance auditing server 460 upon receipt of the cryptographic meeting key at the beginning of the meeting.

At block 960, the compliance auditing participant 462 receives one or more chat messages exchanged by the participants during the encrypted video conference. Upon receipt of the one or more chat messages, the compliance auditing participant 462 may transmit the one or more chat messages to the compliance auditing server 460 for storage.

It should be appreciated that the method 900 described above is only one example according to this disclosure. In other examples, the blocks described above may be performed in a different order or one or more blocks may be omitted. For example, the order of blocks 910-960 may occur in any suitable order according to different examples.

Figure 10:
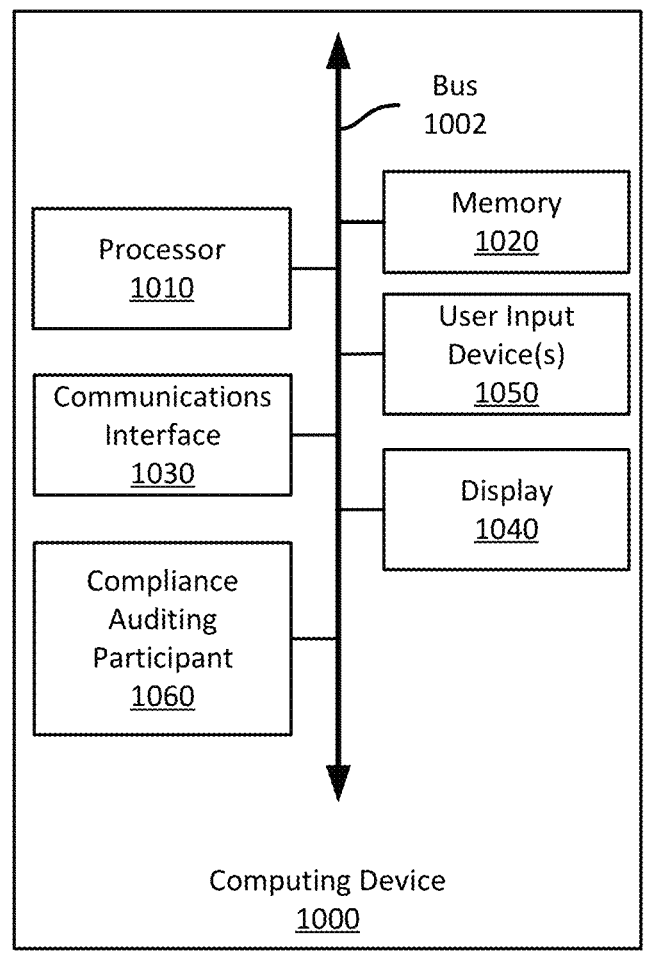
FIG. 10 shows an example computing device suitable for use with any system or method for compliance auditing encrypted video conferences according to this disclosure.

Referring now to FIG. 10, FIG. 10 shows an example computing device 1000 suitable for use in example systems or methods for suggesting user actions during a video conference according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to execute a compliance auditing participant 1060 according to this disclosure or to perform one or more methods for suggesting user actions during a video conference according to different examples, such as part or all of the example methods 600-900 described above with respect to FIGS. 6-9. As discussed above, the compliance auditing participant 1060, when executed by processor 1010, may provide one or more of the compliance auditing techniques for encrypted video conferences as described herein. The computing device, in this example, also includes one or more user input devices 1050, such as a keyboard, mouse, touchscreen, video capture device, microphone, etc., to accept user input. The computing device 1000 also includes a display 1040 to provide visual output to a user.

The computing device 1000 also includes a communications interface 1040. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   receiving, by a compliance auditing server, an indication of an encrypted video conference;
   sending, by the compliance auditing server, a request to a video conference provider to join a compliance auditing participant to the encrypted video conference, wherein the video conference provider does not have access to data stored on the compliance auditing server;
   receiving and storing, by the compliance auditing server, encrypted streams of audio and video from a plurality of participants in the video conference, wherein:
      the compliance auditing participant is one of the plurality of participants;
      the encrypted streams of audio and video are encrypted by the respective participants using a cryptographic meeting key; and
      the video conference provider does not have access to the cryptographic meeting key;
   receiving, by the compliance auditing server after the encrypted video conference has ended, a request for a portion of the encrypted streams of audio and video; and
   providing, in response to the request, the portion of the encrypted streams of audio and video.

2. The method of claim 1, further comprising:
   receiving and storing, by the compliance auditing server, the cryptographic meeting key associated with the encrypted video conference.

3. The method of claim 2, further comprising:
   receiving, by the compliance auditing server after the encrypted video conference has ended, a request for decrypted streams of audio and video;
   decrypting, by the compliance auditing server, a portion of the encrypted streams of audio and video using the cryptographic meeting key to generate the decrypted streams of audio and video; and
   providing, by the compliance auditing server, the decrypted streams of audio and video.

4. The method of claim 1, wherein the compliance auditing participant is a software based application executed by one of:
   a host's client device;
   another computing device; and
   the compliance auditing server.

5. The method of claim 2, further comprising:
   receiving, by the compliance auditing participant, one or more chat messages during the encrypted video conference, wherein the one or more chat messages are encrypted; and
   storing, by the compliance auditing server, the one or more chat messages.

6. The method of claim 5, further comprising:
   receiving, by the compliance auditing server after the encrypted video conference has ended, a request for decrypted message data from the one or more chat messages;
   decrypting, by the compliance auditing server, the one or more chat messages using the cryptographic meeting key to generate the decrypted message data; and
   providing, by the compliance auditing server, the decrypted message data.

7. The method of claim 1, further comprising:
   receiving, by the compliance auditing server after the video conference has ended, a request for the cryptographic meeting key; and
   providing, in response to the request, the cryptographic meeting key.

8. The method of claim 1, wherein receiving and storing the encrypted streams of audio and video comprise:
   transmitting a message to the video conference provider to store the encrypted streams of audio and video.

9. The method of claim 1, wherein the compliance auditing server is hosted by the video conference provider.

10. A system comprising:
    a non-transitory computer-readable medium;
    a communications interface; and
    a processor communicatively coupled to the non-transitory computer-readable medium and the communications interface, the processor configured to execute processor-executable instructions stored in the non-transitory computer-readable medium to:
       receive an indication of an encrypted video conference;
       send a request to a video conference provider to join a compliance auditing participant to the encrypted video conference, wherein the video conference provider does not have access to data stored on the compliance auditing server;
       receive and store encrypted streams of audio and video from a plurality of participants in the encrypted video conference, wherein:
          the compliance auditing participant is one of the plurality of participants;
          the encrypted streams of audio and video are encrypted by the respective participants using a cryptographic meeting key; and
          the video conference provider does not have access to the cryptographic meeting key;
       receive a request for a portion of the encrypted streams of audio and video; and
       provide, in response to the request, the portion of the encrypted streams of audio and video.

11. The system of claim 10, wherein the processor is configured to execute further processor-executable instructions stored in the non-transitory computer-readable medium to:
    receive and store the cryptographic meeting key associated with the encrypted video conference.

12. The system of claim 11, wherein the processor is configured to execute further processor-executable instructions stored in the non-transitory computer-readable medium to:
    receive, after the encrypted video conference has ended, a request for decrypted streams of audio and video;
    decrypt a portion of the encrypted streams of audio and video using the cryptographic meeting key to generate the decrypted streams of audio and video; and
    provide the decrypted streams of audio and video.

13. The system of claim 12, wherein the compliance auditing participant is a software based application executed by one of:
    a host's client device;
    another computing device; and
    the compliance auditing server.

14. The system of claim 11, wherein the processor is configured to execute further processor-executable instructions stored in the non-transitory computer-readable medium to:
    receive and store one or more chat messages received by the compliance auditing participant during the encrypted video conference, wherein the one or more chat messages are encrypted.

15. The system of claim 14, wherein the processor is configured to execute further processor-executable instructions stored in the non-transitory computer-readable medium to:

receive, after the encrypted video conference has ended, a request for decrypted message data from the one or more chat messages;

decrypt the one or more chat messages using the cryptographic meeting key to generate the decrypted message data; and provide the decrypted message data.

16. The system of claim 10, wherein the processor is configured to execute further processor-executable instructions stored in the non-transitory computer-readable medium to:

receive a request for the cryptographic meeting key; and provide, in response to the request, the cryptographic meeting key.

17. The system of claim 10, wherein the instructions to receive and store the encrypted streams of audio and video further cause the processor to execute further processor-executable instructions stored in the non-transitory computer-readable medium to:

transmit a message to the video conference provider to store the encrypted streams of audio and video.

18. A method comprising:

receiving, by a compliance auditing participant executing on a client device, an indication that an encrypted video conference is initiated, wherein the encrypted video conference includes a plurality of participants;

automatically joining the encrypted video conference with the client device;

receiving, by the compliance auditing participant from a host client device, a cryptographic meeting key distributed to each participant of the plurality of participants, wherein the compliance auditing participant is one of the plurality of participants;

recording, by the compliance auditing participant, encrypted streams of audio and video of the video conference; and transmitting, by the compliance auditing participant, the encrypted audio and video to the compliance auditing server.

19. The method of claim 18, further comprising:

receiving, by the compliance auditing participant, one or more chat messages exchanged during the encrypted video conference, wherein the one or more chat messages are encrypted.

20. The method of claim 18, further comprising:

transmitting, by the compliance auditing participant, the cryptographic meeting key to the compliance auditing server.

* * * * *